3,676,196
      COATING FOR WATER CONTAINING
         HYDRAULIC CEMENT ARTICLES
Stephen Mark Quint, Basking Ridge, and John Junior
   Dalton, East Whitehouse, N.J., assignors to Johns-
   Manville Corporation, New York, N.Y.
   No Drawing. Filed Nov. 17, 1969, Ser. No. 877,436
               Int. Cl. B44d 1/20
U.S. Cl. 117—96                                    5 Claims

ABSTRACT OF THE DISCLOSURE

An article constructed of hydraulic calcareous cement material, such as pipe, having a coating on its water containing surfaces composed of a resin copolymer of vinyl toluene and alpha methyl styrene to inhibit dissolving and leaching of water soluble minerals from the cementitious material, and a method of applying the resin coating comprising the use of the resin dissolved in perchloroethylene.

BACKGROUND OF THE INVENTION

Water carying pipe, or water containing tanks, cisterns, etc., are often composed of or contain hydraulic calcareous cement compositions such as portland cement, concrete or asbestos-cement combinations which provide very economical and durable materials for such uses. However, the common presence in hydraulic calcareous cement materials of some soluble forms of lime, such as free or uncombined calcium hydroxide, and/or other water soluble minerals or components, and their relative porous consistency, whereby they are susceptible to dissolution and leaching of such water soluble components in service can present a decided impediment to the use of these materials in certain applications. The occurrence of water soluble minerals or the extent and rate of leaching thereof is of particular concern with potable water and certain process waters, especially with so-called "soft" water or water of low mineral content wherein the rate and extent of leaching can become critical for reasons well known to water chemists.

Typical means of preventing such dissolution and leaching of solubles from cementitious material consists of the application of an asphaltic coating to the surface of the article exposed to the contained water such as pipe or tank interiors. However, in systems of low water transfer or consumption wherein essentially the same volume of water is retained over prolonged periods of contact with the coating, the asphaltic materials often impart an odor or taste to the water.

Additionally, because of the highly porous nature of hydraulic cement materials, including even asbestos-cement products formed under substantial pressure, the application of asphaltic or other water resistant resin coatings dispersed or dissolved in solvent carriers has heretofore required two or more distinct applications to form an effective barrier film since the first application is substantially absorbed into the pores of the structure. A second application, although usually effective, significantly contributes to manufacturing costs.

SUMMARY OF THE INVENTION

This invention comprises an improved coating preparation of vinyl toluene and alpha methyl styrene copolymer to block the dissolution and leaching of lime or other water soluble minerals or components from water containing articles and/or structures composed of hydraulic calcareous cement material and thereby inhibit the resultant adulteration of the water, together with an economically advantageous means of application through the use of perchloroethylene solvent.

It is the primary objective of this invention to provide a durable glass-like, protective coating for water handling hydraulic calcareous cement articles and structures which effectively blocks leaching of solubles therefrom and is relatively inert within the environment of contemplated use in not introducing any odor or taste or other unwanted properties to the water in contact therewith, and which may be economically effectively applied in a single application in many instances.

DESCRIPTION OF THE PREFERRED EMBODIMENT

Although this invention is primarily concerned with asbestos-cement water carrying pipe formed with common portland hydraulic cement as the binder phase and therefore is described with reference to such pipe, the problem of dissolution and leaching of lime or water solubles generally from other water retaining hydraulic cement articles or structures including concrete pipe, tanks, cisterns, reservoir chambers, purification pools, etc., is the same and can be equally effectively resolved by the herein described means of this invention.

This invention essentially comprises the application of a resin copolymer of vinyl toluene with alpha methyl styrene, for example available on the commercial market as "Piccotex 120" from the Pennsylvania Industrial Chemical Corporation, dispersed or dissolved in a solvent consisting of perchloroethylene, to the interior surface of asbestos-cement pipe, or the like exposed surfaces of a water containing article. The quantity of application should range approximately between about 0.2 to 0.5 oz. of the resin solids per square foot of surface area of the cement material, but depending somewhat upon the coarseness of the texture of the surface of the cement body and the degree of porosity thereof. The solution concentration of the resin copolymer in perchloroethylene solvent for optimum application under most conditions should be between approximately 25% (weight) and approximately 40% (weight) of resin solids.

A common spray application is preferred because it is of maximum efficiency and effectiveness, however other techniques will suffice such as dipping or brushing.

The agents or means of this invention, viz, the given copolymer dissolved in perchloroethylene solvent, when applied to typical cement material surfaces such as asbestos-cement pipe interiors or ordinary concrete are not significantly absorbed within the interstices or pores of the cementitious material as with waterproofing asphalts or resins, but form a tenaciously adhering, water impermeable coating film which is glass-like in appearance, odorless, tasteless, resistant to ultraviolet light and substantially all conditions encountered in a water system, as well as most common chemicals.

A specific illustration of the effects and advantages of this glass-like coating with water carrying asbestos-cement pipe is as follows.

The interior surface of a number of sample sections of asbestos-cement water carrying pipe were spray coated with one application of the resin copolymer of vinyl toluene and alpha methyl styrene, "Piccotex 120" (Pennsylvania Industrial Chemical Corporation) dissolved in perchloroethylene at a concentration of about 30% by weight of resin solids. The spray was applied at a rate of about .5 oz. to 1 oz. solution per square foot of surface area. This single application produced a glass-like inner lining on the surface which was tack-free in about 30 minutes at room temperature, well bonded thereto and of about one to two mils of thickness. Samples of the thus coated asbestos-cement pipe sections were employed in the following evaluations to ascertain their durability and relative inertness of the coating within the environment of their contemplated use.

TABLE 1

Standpipe Test—Distilled Water Retained Unchanged

| Days | pH | Total hardness | Phenolphthalein alkalinity | Total alkalinity |
|---|---|---|---|---|
| Start | 6.6 | 5 | 0 | 15 |
| 1st | 6.7 | 5 | 0 | 15 |
| 2nd | 6.8 | 5 | 0 | 15 |
| 3rd | 6.8 | 5 | 0 | 15 |
| 4th | 6.9 | 5 | 0 | 15 |
| 7th | 6.8 | 5 | 0 | 15 |

This establishment of no discernible change in the hardness or alkalinity of the water clearly demonstrates the absence of any dissolution and leaching of lime from the asbestos portland cement pipe material.

Additional samples of the single application coating of the composition of this invention to the interior of asbestos-cement pipe were subjected to the following miscellaneous tests directed to establishing the utility and advantages of the coating relative to the contemplated use.

TABLE 2

| Test | Duration | Comments |
|---|---|---|
| Total immersion interior coated pipe sample in water. | 2 weeks | No change in lining. |
| Fadeometer [1] | do | No flaking. |
| Weatherometer [2] | do | Coating integrity and adherence maintained. |
| Outdoor exposure | do | No change. |
| Water erosion test (pipe ends plugged and filled to about ¾ full of water, rotated at 55 r.p.m. approximately 1.5 ft./min.). | 92 hours | No apparent change in lining. |

[1] Intense ultraviolet light plus heat (extreme acceleration of conditions).
[2] Ultraviolet light plus rain (1 day equals approximately 3 days of summer rain and sun).

The performance of the resin in this invention in relation to apparently comparable resinous materials is demonstrated by the following evaluation:

TABLE 3

| Resins evaluated | Comments |
|---|---|
| Polyterpene | Subject to ultraviolet degradation. |
| Alpha polyterpene | Do. |
| Hydrocarbon | Retained solvent odor. |
| Vinyl toluene and alpha methyl styrene copolymer. | Odorless. |

The significance of the solvent in this invention in relation to other common solvents when employed with the vinyl toluene and alpha methyl styrene copolymer is demonstrated by the following comparative evaluation:

TABLE 4

| Solvent | Comments |
|---|---|
| Odorless mineral spirits | Dries too slowly and retains odor. |
| Trichloroethylene | Dries too fast. |
| Xylene | Retains odor. |
| Perchloroethylene | Maintains resins on surface of pipe when wet without breaks. Dries resins at effective rate. |

Although a single coating application will suffice with asbestos-cement products having a smooth surface texture normally attained under proper manufacturing conditions, where the product surface texture is coarse or rough as may occur with worn forming apparatus such as abraded forming mandrels, two applications of the coating material are appropriate to insure an effective barrier film.

The following comprises a specific illustration of the effects of this invention when the coating is applied in a two-step procedure wherein the asbestos-cement pipe products present a relatively coarse or rough interior surface attributable to a wear abraded or roughened forming mandrel.

The interior surfaces of lengths of asbestos-cement pipe were twice sprayed with 30% by weight resin solution of the copolymer of vinyl toluene and alpha methyl styrene dissolved in 70% by weight of perchloroethylene in amount of about 0.2 oz. of resin solids per square foot of surface area with each application, and with the second application following the first at about one half hour. After 48 hours sample sections of the twice coated pipe were tested and produced the following data. That is upon containing the same water for the indicated periods of time, the given conditions were found:

TABLE 5

| Days | pH | Total hardness | Phenolphthalein alkalinity | Total hardness |
|---|---|---|---|---|
| Start | 6.8 | 5 | 0 | 5 |
| 3 | 7.3 | 5 | 5 | 10 |
| 5 | 7.5 | 5 | 5 | 10 |
| 7 | 7.4 | 5 | 5 | 10 |

We claim:

1. A method of inhibiting dissolution and leaching of water soluble minerals from within hydraulic calcareous cementitious material comprising coating the exposed surface of the body of the cementitious material with a solution consisting essentially of resin copolymer of vinyl toluene and alpha methyl styrene dissolved in perchloroethylene followed by drying of the coating.

2. The method of claim 1 wherein the resin solution is applied in amount of about 0.2 to 0.5 oz. of resin solids per square foot of surface area of the cementitious material.

3. The method of claim 1 wherein the resin solution is of a concentration of about 25 to 40% by weight of the resin solids.

4. The method of claim 1 wherein the resin solution is applied by means of a spray application.

5. The method of claim 1 wherein the resin solution concentration is about 30% by weight of resin and is applied by spray application in amount of about 0.5 oz. to 1 oz. per square foot of surface area of the interior of asbestos-cement pipe.

References Cited

UNITED STATES PATENTS

| 2,285,562 | 6/1942 | Britton et al. | 260—33.8 UA |
| 2,331,263 | 10/1943 | Britton et al. | 260—33.8 UA |
| 2,973,285 | 2/1961 | Berke et al. | 117—123 X |
| 3,106,486 | 10/1963 | Harren et al. | 117—123 D |
| 3,294,709 | 12/1966 | Nitzsche et al. | 117—123 X |
| 3,479,213 | 11/1969 | Takeda | 260—33.8 UA |

OTHER REFERENCES

Boandy, Rag H., Styrene, Its Polymers, Copolymers and Derivatives, 1952, TP98 S71 C5, pp. 1241-4.

WILLIAM D. MARTIN, Primary Examiner

M. R. LUSIGNAN, Assistant Examiner

U.S. Cl. X.R.

117—123 D, 126 AB